US010055600B2

(12) United States Patent
Shukla et al.

(10) Patent No.: US 10,055,600 B2
(45) Date of Patent: Aug. 21, 2018

(54) ANALYSIS AND SPECIFICATION CREATION FOR WEB DOCUMENTS

(71) Applicant: Tata Consultancy Services Limited, Mumbai (IN)

(72) Inventors: Manish Shukla, Pune (IN); Kumar Vidhani, Pune (IN); Joel Joseph, Pune (IN); Vijayanand Mahadeo Banahatti, Pune (IN); Sachin Lodha, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 14/046,181

(22) Filed: Oct. 4, 2013

(65) Prior Publication Data

US 2014/0101784 A1    Apr. 10, 2014

(30) Foreign Application Priority Data

Oct. 4, 2012    (IN) .......................... 2919/MUM/2012

(51) Int. Cl.
*G06F 21/62*    (2013.01)
*G06F 17/30*    (2006.01)

(52) U.S. Cl.
CPC .... *G06F 21/6218* (2013.01); *G06F 17/30867* (2013.01); *G06F 21/6245* (2013.01); *G06F 21/6254* (2013.01); *G06F 2221/2115* (2013.01)

(58) Field of Classification Search
CPC ..... H04L 9/32–9/3297; H04L 63/04–63/0492; H04L 63/08–63/0892; G06F 17/24; G06F 17/30; G06F 15/173; G06F 21/62; G06F 21/6245; G06F 21/6254; G06F 21/6218; G06F 17/30867; H04N 1/40

USPC ........................ 726/30, 4, 16, 17, 21, 22, 26
See application file for complete search history.

(56) References Cited

U.S. PATENT DOCUMENTS

| 5,982,370 A | 11/1999 | Kamper |
| 6,085,190 A | 7/2000 | Sakata |
| 6,820,237 B1 | 11/2004 | Abu-hakima et al. |
| 7,085,736 B2 | 8/2006 | Keezer et al. |
| 2003/0037038 A1* | 2/2003 | Block et al. ...................... 707/1 |

(Continued)

OTHER PUBLICATIONS

"Informatica, Dynamic Data Masking Introduction", [online]. (c) 2010 Actuvebase Ltd. [archived on Mar. 4, 2010]. Retrieved from the Internet: <http://web.archive.org/web/20100304140033/http://www.active-base.com/?>, (2010), 1 pg.

(Continued)

*Primary Examiner* — Ashok Patel
*Assistant Examiner* — Quazi Farooqui
(74) *Attorney, Agent, or Firm* — Schwegman Lundberg & Woessner, P.A.

(57) ABSTRACT

Described herein is a method for rendering specification creation, including identifying, within one or more contents, labels as sensitive labels when data associated with the label are determined sensitive based on one or more user-defined policy rules, wherein the identifying considers structural locations of labels determined as sensitive and the data associated with the sensitive label; configuring rendering specifications for data associated with the identified sensitive labels; and associating the configured rendering specifications with the sensitive labels of the data determined as sensitive, for execution in real time.

19 Claims, 6 Drawing Sheets

(56) References Cited

U.S. PATENT DOCUMENTS

| | | | |
|---|---|---|---|
| 2005/0289342 A1* | 12/2005 | Needham et al. | 713/169 |
| 2006/0010379 A1 | 1/2006 | Kashi | |
| 2006/0259614 A1* | 11/2006 | Patrick | G06Q 10/10 |
| | | | 709/224 |
| 2007/0030528 A1* | 2/2007 | Quaeler | G06F 17/24 |
| | | | 358/453 |
| 2009/0048997 A1* | 2/2009 | Manickam | G06F 21/62 |
| | | | 706/47 |
| 2011/0239113 A1* | 9/2011 | Hung | G16H 15/00 |
| | | | 715/271 |
| 2011/0321120 A1 | 12/2011 | Saxena et al. | |
| 2013/0144901 A1* | 6/2013 | Ho | G06F 17/30498 |
| | | | 707/769 |

OTHER PUBLICATIONS

Banahatti, V., et al., "Safe Mask", [online]. Retrieved from the Internet: <tcs-trddc.com/trddc_website/pdf/SRL/banahatti_s_2009.pdf>, (2009), 9 pgs.

"European Application Serial No. 13187421.6, Extended European Search Report dated Jan. 22, 2014", 5 pgs.

"European Application Serial No. 13187421,6, Response filed Jun. 17, 2014", 14 pgs.

\* cited by examiner

ANALYSIS AND SPECIFICATION CREATION FOR WEB DOCUMENTS

CLAIM OF PRIORITY

This application claims the benefit of priority under 35 U.S.C. Section 119 to Indian Patent Application Serial Number 2919/MUM/2012 filed 4 Oct. 2012, which is incorporated herein by reference in its entirety.

TECHNICAL FIELD

The present subject matter, in general, relates to a rendering specification creation for web documents and, in particular, relates to a rendering specification creation for data masking.

BACKGROUND

Organizations presently possess huge amounts of data related to various aspects of their business, such as employees, business partners, operations, and management, stored in databases of content sources. Data stored in the databases is often used for different purposes, such as testing, training, demonstration, and data research, and may be accessed by people within the organization as well as outside the organization.

The data stored in the databases is also accessible as web content over web pages or through other interfaces. The web content represented over the web pages thus contains both sensitive and non-sensitive data. Accordingly, care needs to be taken to ensure that at least the sensitive data is inaccessible to unauthorized people, either from within the organization or from outside. A failure to do so may result in the theft of data or unnecessary disclosure of sensitive information. For example, a sensitive data used for a bank may include customer's data, such as name, account number, credit card number, debit card number, and address of the customers. In many scenarios, to carry out the day-to-day operations of the bank or other organizations, revealing the identity of customers through the customer's data is not acceptable. However, in many situations, such as for training and testing purposes, the customer's data may have to be shared with other employees, even if they are not authorized to access the data. This may lead to disclosure of sensitive data.

Conventionally, data masking techniques have been used to protect the data. In data masking techniques, the data which is not to be disclosed to everyone is replaced with dummy data. The dummy data looks like the original data but is not the original data.

SUMMARY

This summary is provided to introduce concepts related to real time rendering specification creation through web document analysis, which is further described below in the detailed description. This summary is not intended to identify essential features of the claimed subject matter nor is it intended for use in determining or limiting the scope of the claimed subject matter.

In one implementation, a method for rendering specification creation is described herein. The method includes identifying, within one or more contents, labels as sensitive labels when data associated with the labels are determined sensitive based on one or more user-defined policy rules, where the identifying the label as sensitive labels includes identification of structural locations of labels determined as sensitive and their corresponding data; configuring rendering specifications for data associated with the identified sensitive labels; and associating the configured rendering specifications with the sensitive labels of the data determined as sensitive, for execution of the rendering specifications in real time.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
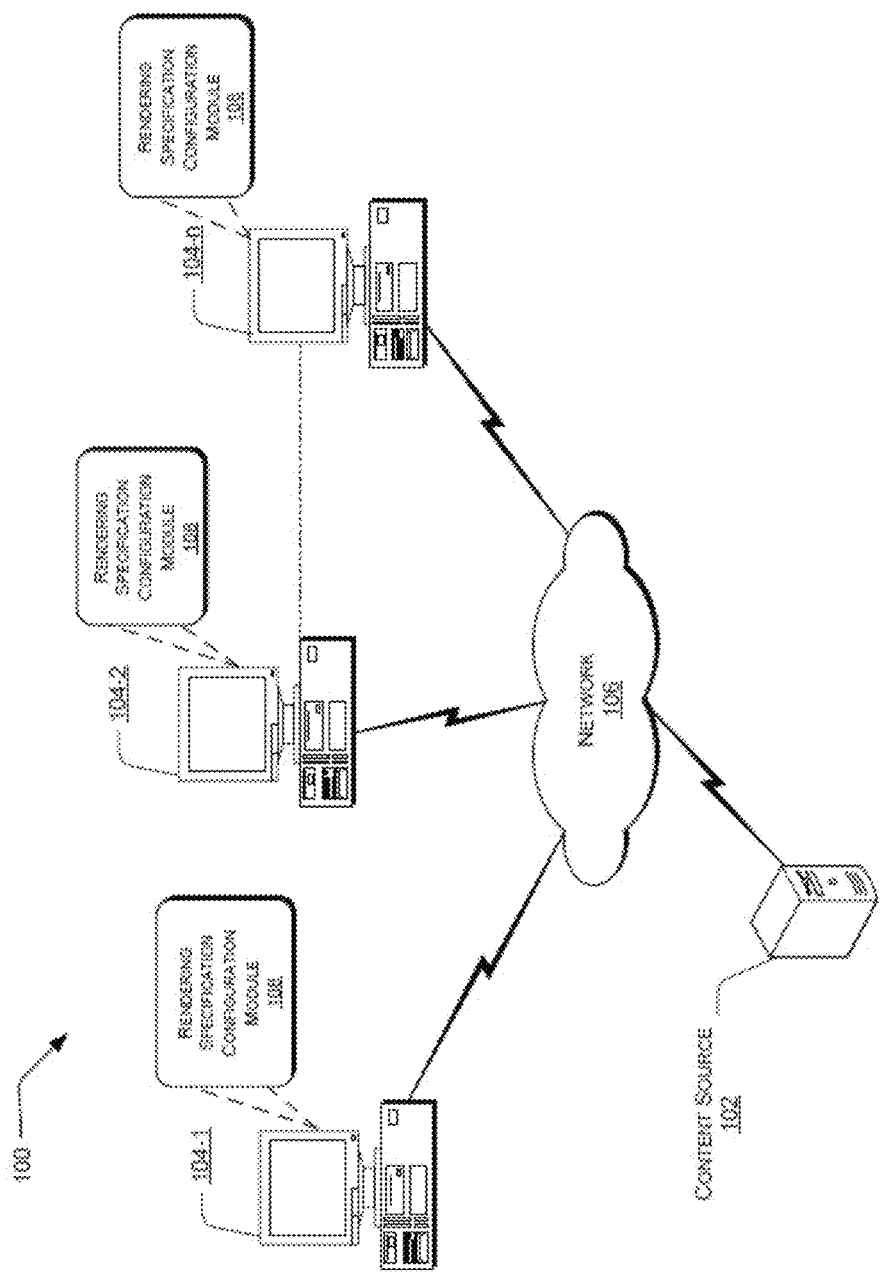
FIG. 1 illustrates an architecture implementing a rendering specification creation system, according to an embodiment of the present subject matter.

Today, many organizations have offices spread across multiple geographies. Work of the organizations is divided among multiple offices to increase productivity and operational efficiency. Some work is even outsourced to other countries or other organizations in the same country. While dividing work, there is possibility that organization has to share data of customers to offshore locations via web pages or web documents. Revealing identity of customers is not acceptable as the data of the customers includes both sensitive and non-sensitive data. Accordingly, care needs to be taken to ensure that at least the sensitive data is inaccessible to unauthorized people either from within or outside the organization. Furthermore, an organization may also be faced with a similar scenario in cases where the data is to be provided to different individuals for carrying out the day-to-day operations.

Conventionally, in order to avoid the unnecessary disclosure of the data, which is hereinafter referred to as original data or un-masked data, data masking techniques are used. Data masking techniques help to replace or redact the sensitive data, with dummy data. For example, the customer name in a bank database can be replaced with a coded name or any other fictitious name, or can simply be obfuscated. With data masking, masked data can be made to look like or behave like the original data, even though it is not the original data. The masked data can subsequently be used for different purposes, such as training, testing, demonstration, and research without the risk of exposing confidential information and theft of the original data.

Usually, a web page contains multiple sensitive data, configuring masking specification for one sensitive data at a time can be an error prone, tedious and time consuming process. Moreover, the implementation of the masking specifications is limited to masking of the data only.

According to an embodiment of the present subject matter, a method for a rendering specification creation for web documents is described herein. In one implementation, an end user sends a request from an application to a content source for retrieval of content stored in the content source. Such content can include labels that are indicative of data considered as sensitive. Such a label is identified as sensitive label when data associated with the labels are determined sensitive based on one or more user-defined policy rules. The identification of the sensitive labels includes identification of structural locations of the sensitive labels and the data associated with the sensitive labels. The sensitive label represents at least one of a text, an image, a functional button, a text-area, a selection box and a navigation link. Based on the received request, one or more content are obtained from the content source. It should be noted that the contents received in response to the request is in original form, and may also include data associated with a sensitive label. Once the content is received, the sensitive labels within the received contents are identified based on the policy rules with their structural locations consideration. Once identified, one or more rendering specifications can be selectively configured for the data associated with the sensitive labels. The configured rendering specifications are then associated with the sensitive labels of the data determined as sensitive, for execution in real times.

The configuration of the rendering specification may be performed either online or offline by using a rendering specification creation system. In one implementation, once the configuration of the rendering specification is performed by the rendering specification creation system, the execution of the rendering specification is carried out in real time using an execution system which is not a part of the rendering specification creation system.

In an implementation, the rendering specification configured in accordance with the present subject matter can be executed to mask values or data associated with the sensitive labels, to block navigation associated with the sensitive labels, to block display of the sensitive labels, to validate the input values/data associated with the sensitive labels, to track end user activities onto the values or data associated with the sensitive labels, and to facilitate automatic log-in for an account by automatically providing the data or credentials associated with the sensitive labels.

In an implementation, the identification of the label as the sensitive label includes highlighting the sensitive labels with a colour distinct from the background colour of the content while taking structural locations of the sensitive labels and the data associated with the sensitive labels into considerations.

Further, in an implementation, the configuration of the rendering specifications may be performed on-the-fly by the end user. The term "on-the-fly" may be understood as the activity that develop or occur dynamically rather than as the result of something that is statically predefined. For example, the data of a content that is sent from a content source can be developed or varied "on-the-fly" based on dynamic factors, such as time of day, authentication of users, or specific user input. Thus, the configuration of the rendering specifications on-the-fly can be understood as a process of actively accessing from the content source on a client device, for the purpose of configuring the rendering specification on the client device.

In an implementation, the content can be at least one of a web page, a web document, a hypertext markup language (HTML) document, and an extensible markup language (XML).

In an implementation, the method described herein can be implemented for managing roles of end users for the application, wherein the managing the roles comprises creation, modification, and deletion of roles of the end users.

In another embodiment, a rendering specification creation system for creating a real time rendering specification through web document analysis is described.

The above method(s) and system(s) are further described in conjunction with the following figures. It should be noted that the description and the figures merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

FIG. 1 illustrates an architecture 100 implementing a rendering specification creation system in accordance with an embodiment of the present subject matter. In said implementation, the architecture 100 includes a content source 102 communicating with one or more client devices 104-1, 2 . . . , n (collectively referred to as client devices 104). The content source 102 communicates with one or more of the client devices 104 over a network 106.

The network 106 may be a wireless network, wired network or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other.

In an embodiment, the content source 102 stores data or web data, which can include HTML (hypertext markup language) data, XML (extensible mark-up language) data, data through web service connections, scripts (for example, Java™ Script, Perl Script, PHP, and etc.), or code base (for example, CGI (common gateway interface), Applets and ActiveX controls using either hypertext transfer protocol (HTTP) or hypertext transfer protocol secure (HTTPS).

In an example, the content source 102 may be a web server, data server, database or file. Further, the client devices 104 can be devices that are utilized for requesting access for contents which otherwise may include sensitive labels.

In the present implementation, the client devices 104 are implemented as the rendering specification creation system 104 for rendering data in conformance with a rendering specification. In such case, the content for which access is requested by any one of the users can be obtained by the rendering specification creation system 104 from the content source 102.

In other implementations, the rendering specification creation system 104 can be associated with the content source 102. In such cases, the content source 102 can be included within the memory of the rendering specification creation system 104. Such implementations would also be included within the scope of the present subject matter.

Further, in an implementation, the rendering specification creation system 104 includes a rendering specification configuration module 108 for configuring or creating rendering specifications for the label identified the sensitive label.

Figure 2:
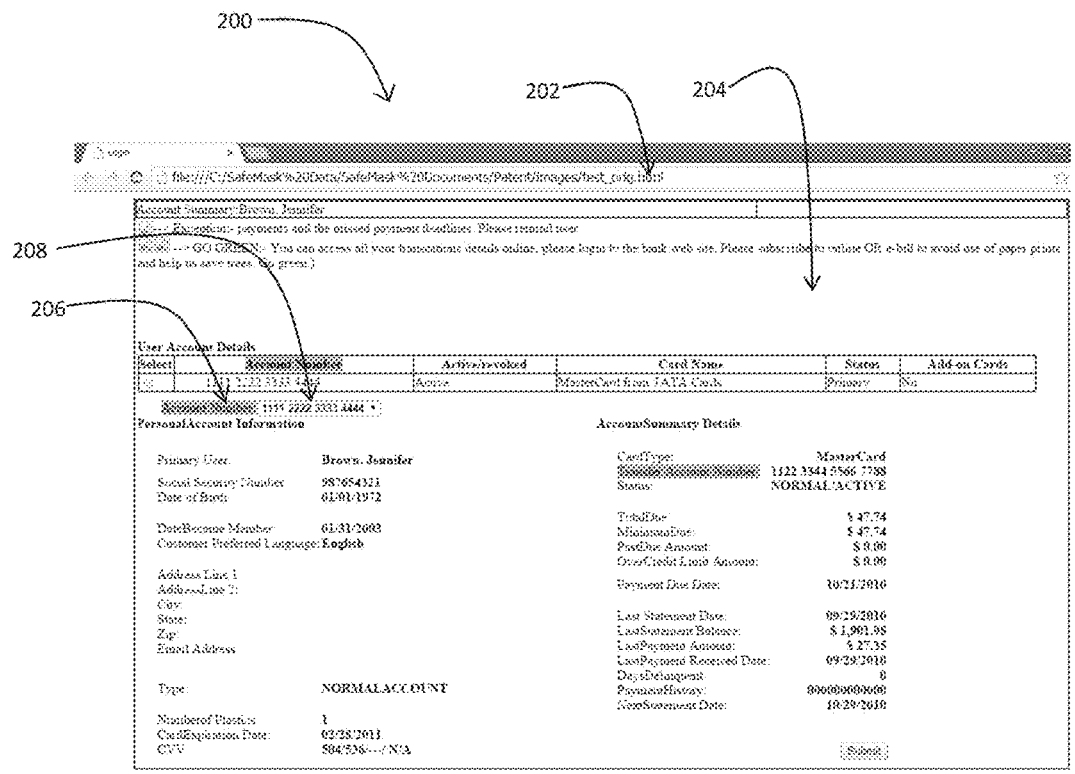
FIG. 2 illustrates a web browser user interface as it would be viewed by an end user after identification of sensitive labels, in accordance with an embodiment of the present subject matter.
Figure 3:
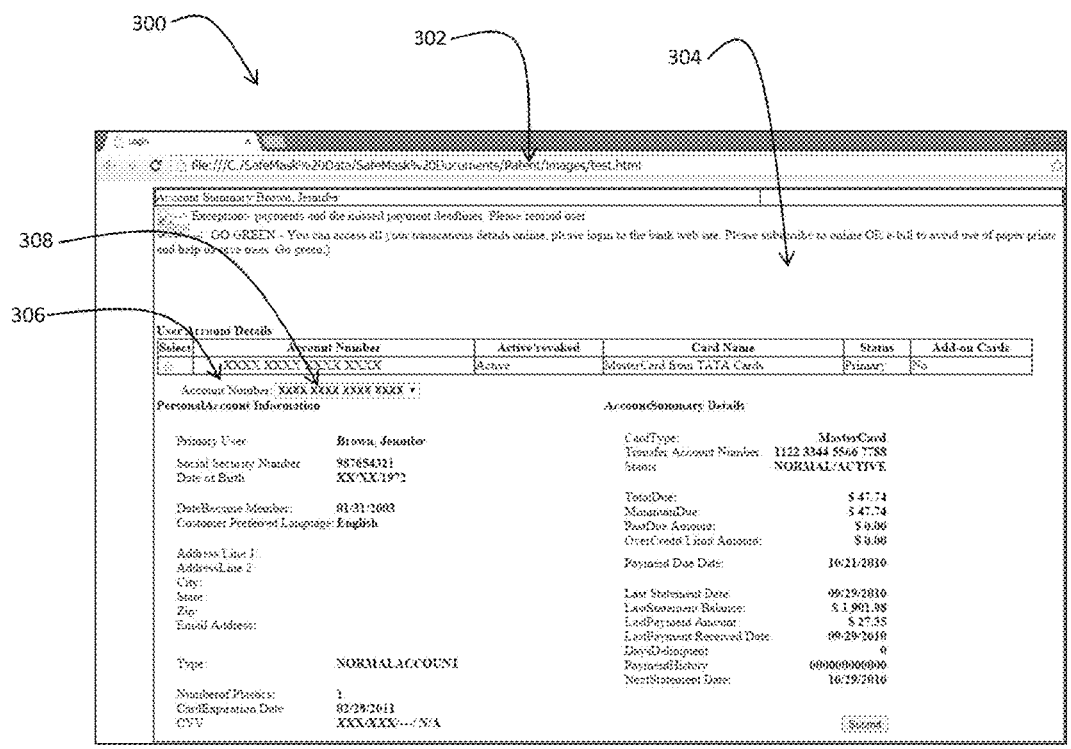
FIG. 3 illustrates a web browser user interface depicting the implementation of the rendering specification on data associated with the sensitive labels, in accordance with an embodiment of the present subject matter.

FIGS. 2 and 3, from an end user's perspective, shows an exemplary execution of rendering specification for rendering data associated with the sensitive labels present on a web page 202 provided as the content. The web page 202 as illustrated in FIG. 2 is similar (possibly identical) in its layout and structure to the web page 302 of FIG. 3. The only difference between the two pages may be the data that is rendered in each of the corresponding locations on each of the respective pages 202 and 302. FIGS. 2 and 3 are discussed in detail below.

FIG. 2 illustrates a web browser user interface 200 as it would be viewed by an end user, in accordance with one embodiment of the present subject matter. The web browser user interface 200 includes a main window 204, which displays the web page 202 upon which a plurality of labels and their corresponding values or data are displayed. In an example, consider a text "Account Number: 1111 2222 3332 4444", where the label 206 is "Account Number" and the data or value 208 is "1111 2222 3333 4444". The web page 202 also includes other labels, as for example, a primary user, a social security number, date of birth, etc., in the main window 204.

Further, it can be seen from the FIG. 2 that the web page 202 received in response to the request is in original form, and also includes data associated with each label. Once the web page 202 is received, the labels associated with the data that conforms to one or more user-defined policy rules is identified as the sensitive labels. Once identified, the sensitive labels are highlighted on the web page 202. For example, as can be seen from FIG. 2 that the labels, such as "Account Number" and "Transfer Account Number" are highlighted as the sensitive labels.

Once the sensitive labels are identified, an end user can individually select the sensitive labels to configure rendering specification. In an implementation, the web browser user interface 200 includes the rendering specification configuration module 108. Upon individual selection of a sensitive label, the rendering specification configuration module 108 is executed as an additional frame or an additional window. The rendering specification configuration module 108 provides an interface (e.g., titled "Create New Rendering Specification") through which the end user can create, update or delete the rendering specification for the data associated with the selected sensitive label. The rendering specification configuration module 108 allows the end user to interactively use the web page 202 in the browser window 204 as a template for creating the new rendering specification.

Once the rendering specification is configured, the rendering specification is associated with the sensitive label. In order for a rendering specification to be successfully applied, the web page structure (and structured graph representation) of the rendered web page 302 to which the rendering specification is created has be similar to the web page structure (and structured graph representation) of the web page 202 to which the rendering specification is applied. A rendering specification may still be successfully applied, however, even if there are differences between the structures of the pages, since certain structural differences may not affect application of the rendering specification.

In an example, subsequent to the association of the configured rendering specification with the sensitive label, the rendering specification can be executed in real time. The execution renders the data associated with the sensitive label based on the rendering specification. FIG. 3 illustrates an example of web browser user interface 300 as it would be viewed by an end user after rendering of the value or data associated with the sensitive labels, in accordance with one embodiment of the present subject matter. The web browser user interface 300 includes a main window 304, which displays the rendered web page 302. The rendered web page 302 to which the rendering specifications are executed is similar in structure to the web page 202 to which the configured rendering specification is applied. The only difference between the example web pages 202, 302 illustrated in FIGS. 2 and 3 is that the value or data 308 associated with the sensitive label 306 is rendered as per the configured rendering specification.

In the example represented in FIGS. 2 and 3, the rendering specification configured in accordance with the present subject matter is executed to mask the value or data 208, 308 associated with the sensitive label 306. However, in other implementations, the so configured rendering specification can also be executed in real time to block navigation from the sensitive label, to block display of the sensitive label, to validate the input values or data associated with the sensitive label, to track end user activities performed on the data associated with the sensitive label, and to facilitate automatic log-in of an account by automatically providing the data or credentials associated with the sensitive labels. These other implementations are described in detail after the description of FIG. 4.

Further, the rendering specification configuration module 108 is implemented in the rendering specification creation system 104, which is described in more detail in the following with reference to FIG. 4.

Figure 4:
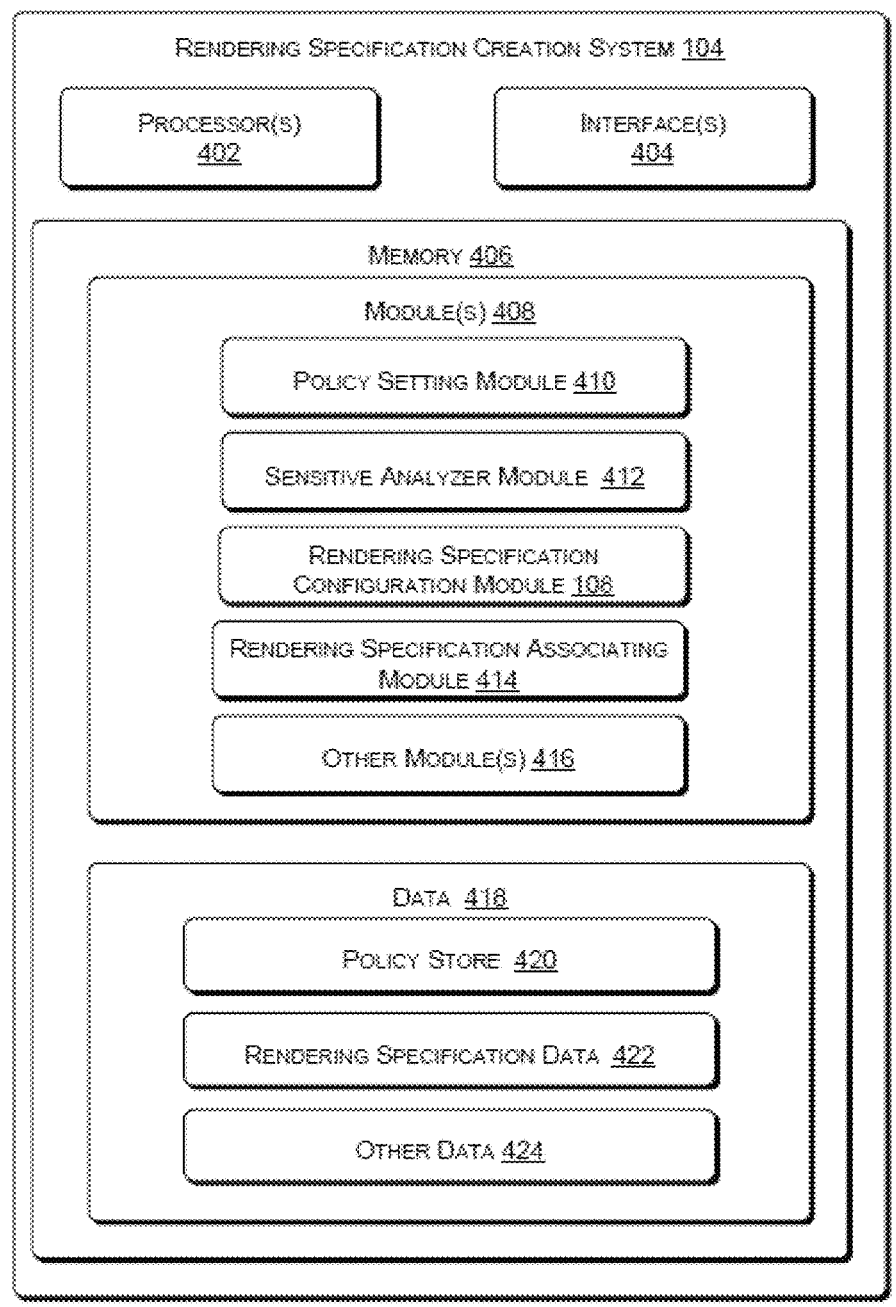
FIG. 4 illustrates a rendering specification creation system, in accordance with an embodiment of the present subject matter.

FIG. 4 illustrates the rendering specification creation system 104, in accordance with an embodiment of the present subject matter. In said embodiment, the rendering specification creation system 104 includes processor(s) 402, interface(s) 404, and a memory 406. The processor 402 may be implemented as one or more microprocessors, microcomputers, microcontrollers, digital signal processors, central processing units, state machines, logic circuitries, and/or any devices that manipulate signals based on operational instructions. The processor 402 is coupled to the memory 406. Among other capabilities, the processor 402 is configured to fetch and execute computer-readable instructions and/or applications stored in the memory 406.

The interface(s) 404 may include a variety of software and hardware interfaces, for example, a network interface allowing the rendering specification creation system 104 to interact with the content sources. Further, the interface(s) 404 may enable the rendering specification creation system 104 to communicate with other computing devices, such as web servers and external repositories or databases. The interface(s) 404 can facilitate multiple communications within a wide variety of networks and protocol types, including wired networks, for example, LAN, cable, etc., and wireless networks, such as WLAN, cellular, or satellite.

The interface(s) 404 may include one or more ports for connecting a number of computing devices to each other or to another server.

The memory 406 can include any computer-readable medium known in the art including, for example, volatile memory (e.g., RAM), and/or non-volatile memory (e.g., EPROM, flash memory, etc.,). The memory 406 includes modules 408, which in turn include the rendering specification configuration module 108, a policy setting module 410, a sensitive analyzer module 412, a rendering specification associating module 414, and other module(s) 416. The other module(s) 216 may include programs or coded instructions that supplement applications and functions of the rendering specification creation system 104. It will be appreciated that such modules may be represented as a single module or a combination of different modules.

In one implementation, the memory 406 further includes data 418. The data 418 serves, amongst other things, as a repository for storing data processed, received and generated by one or more of the modules 408. The data 418 includes, for example, a policy store 420, a rendering specification data 422 and other data 424. In one implementation, the policy store 420, rendering specification data 422, and other data 424 may be stored in the memory in the form of data structures.

In accordance with the present subject matter, the rendering specification creation system 104 is configured to create masking specifications for data associated with sensitive labels present within one or more contents. In order to create rendering specification, the end user of the rendering specification creation system 104 requests for retrieval of the contents stored in the content source 102. Based on the request, one or more contents are obtained by the rendering specification creation system 104. Once the contents are received, the policy setting module 410 obtains one or more user-defined policy rules from the policy store 420. The policy store 420 includes a plurality of policy rules that are used to identify the sensitive labels within the contents. Such sensitive labels are usually associated with values or data determined as sensitive based on the user-defined policy rules. Further, the policy rules may include at least one of string token-based policy rules, hyperlink-based policy rules, pattern value-based policy rules, pattern key-based policy rules, and input control based rules.

As would be appreciated, the contents obtained from the content source 102 may include sensitive labels, which may include personal identification information (PII). For example, a PII may include data, such as name, account number, social security number, date of birth, and address of the customers. Thus, care shall be taken for the sensitive labels in order to secure the personal identification information (PII).

In accordance with the present subject matter, the sensitive labels are to be identified with in the contents retrieved from the content source 102 for configuring the rendering specifications. In order to identify the sensitive labels, the sensitive analyzer module 412 applies the one or more policy rules stored in the policy store 420 on the one or more contents. Based on the policy rules, the sensitive analyzer module 412 highlights sensitive labels with a colour distinct from the background colour of the contents, as can be seen from FIG. 2. This will help the end users to visualize the sensitive labels present within the contents.

Further, once the sensitive labels are identified, a page uniqueness module (not shown in figures) of the rendering specification creation system 104 recognize each of the contents based on individual structures associated to the each of the contents, rather than location addresses of the contents. In an example, in case the contents are web pages, then the web pages are recognized based on structures of the individual web pages, rather than uniform resource location (URL) addresses of the web pages. In order for a rendering specification to be successfully applied, the structure (and structured graph representation) of the rendered web page to which the rendering specification is created has be similar to the structure (and structured graph representation) of the web page to which the rendering specification is applied.

Further, in an implementation, the rendering specification creation system 104 further includes an active guidance module (not shown in figures) that is configured to provide active guidance to an end user in the process of configuring or creating the rendering specification. For the purpose of active guidance, the active guidance module scans through the entire content and that finds out links to other content. Further, the active guidance module also alerts the end user when the active guidance module identifies any sensitive label not analyzed by the sensitive analyzer module 412 on any visited content.

Further, in an implementation, before identification of the sensitive labels, an end user can manually configure the labels as the sensitive labels based on one or more user-defined policy rules. The configuration of the labels as the sensitive labels includes creation of a new label as sensitive label, modification of the existing label as the sensitive label, and deletion of an existing sensitive label.

Once the sensitive labels are identified, the rendering specification configuration module 108 configures rendering specification for the data associated with sensitive labels identified based on the policy rules.

In an implementation, the end user can configure the rendering specification using the rendering specification configuration module 108 by directly selecting the highlighted individual sensitive labels. After directly selecting one of the highlighted individual sensitive labels, the rendering specification can be configured by selecting a rendering specification from a drop-down of pre-defined rendering specification.

In another implementation, as per the requirement, the end user can create a new rendering specification, modify the existing rendering specification, and delete the existing rendering specification.

In yet another implementation, the rendering specification configuration module 108 is also configured to enable the end user of the rendering specification creation system 104 to search hidden fields in the contents and to configure the rendering specification for the hidden fields.

The above-mentioned rendering specification creation process is then repeated for a plurality of contents having sensitive data associated with the sensitive labels. Once rendering specifications have been configured for the data associated with the sensitive labels, the configured rendering specifications are associated with the sensitive labels and stored in the rendering specification data 422 by means of the rendering specification associating module 414.

In an implementation, the end user can also go through the history of rendering specification creation using a record-and-play module (not shown in figures) of the rendering specification creation system 104. The record-and-play module is configured to remember the contents configured up to an instance.

Further, in an implementation, an audit module (not shown in figures) can be provided in the module(s) 408 to track logs of actions performed by the end user for auditing purpose.

In an implementation, the rendering specification configured in accordance with the present subject matter can be executed in real time to mask values or data associated with the sensitive labels, to block navigation associated with the sensitive labels, to block display of the sensitive labels, to validate the input values/data associated with the sensitive labels, to track end user activities onto the values or data associated with the sensitive labels, and to facilitate automatic log-in for an account by automatically providing the data or credentials associated with the sensitive labels. These and other implementations are discussed in detail in the following.

Page Analysis for Sensitive Information:

Before the configuration of the rendering specification configured in accordance with the present subject matter, the present subject matter can be executed to simply analyze sensitive information present on a page for the purpose of generating a report. The sensitive information present on a page can be analyzed for a number of purpose, as for example, to search for defaulters who have not submitted their loan installments, to search for employees not present on a particular day in office, or to search for the expiry date of credit or debit card.

As for example, in case of credit or debit cards, cards have expiry dates printed on them to remind you of when they become unusable. The same expiry dates are maintained by the banks for the purpose of verification of user and for the purpose of renewing the card whenever the expiry date is within last one month of time frame. For example, a page or a web page may include personal identification information (PII) of a number of users. The PII may include data, such as name, card number, card verification value (CVV) number, social security number, card expiry date, date of birth, and address of the customers. In order to identify the card within last one month from the expiry date, a bank employee or a person working at BPO (Business Process Outsourcing) of a Bank may apply a policy rule that identifies the credit card number having the expiry date lying within in the time frame of last one month. The mentioned policy rule is then applied by sensitive analyzer module to highlight the cards having the expiry date lying within in the time frame of last one month, in accordance with an embodiment of the present subject matter. The so highlighted cards are then reported to the bank for issuing a new card to exiting card user before the expiry date. Thus, by using the mentioned process of analyzing the sensitive information on a page, a new card usually arrives a month before the old one expires. The process becomes simple and accomplishes certain things for your card company, in accordance with the present subject matter.

Data Masking:

The rendering specification configured in accordance with the present subject matter can be executed to mask the data associated with sensitive labels in several ways. For masking data, labels that are indicative of data as sensitive are to be determined. Such a determination can be based on one or more user-defined policy rules. Once the sensitive labels are determined or identified, the rendering specification is to be configured for the data or values associated with the sensitive label. The rendering specification can be executed to perform masking transformation technique for masking the data associated with the sensitive label. With the rendering specification, masking transformation performs masking by position of masking (Pre, Post, All), number of position to be masked, and masking symbol to be used.

Further, the present subject matter allows an end user to mask data associated with the sensitive label at run time for a particular application. Thereby, a user can configure rendering specification to mask data associated with the sensitive label for web application. For configuring the rendering specification for web application, a masking tool is developed in accordance with the present subject matter. The masking tool is installed in a web browser and helps the end user to configure the rendering specification for masking the data associated with the sensitive label. In first step for configuring the rendering specifications, sensitive labels are identified in web applications. The creation of rendering specifications for any web page involves identifying the locations of the sensitive labels and variable values or data associated with the sensitive labels. Once the locations of the sensitive labels are identified, the user can proceed with the configuration of the rendering specification. Instead of configuring new rendering specification, the user can also search for the existing rendering specifications or even can remove the existing rendering specification executed on a particular data associated with the sensitive label.

The rendering specification for data masking may help to replace or redact the values or data associated with the sensitive label, with a dummy data. The rendering specification for data masking may substitute virtual data in place of original data or may shuffle the original data with each other. In accordance with the present subject matter, the rendering specification configuration module 108 supports a number of masking specifications, such as static substitution specification, dataset substitution specification, random substitution specification, shuffling specification, and encryption specification.

Making Data Unusable:

Web document or web page includes data associated with sensitive labels in different types of elements. Data may be represented in text, image, button, and link. All these different elements have different purpose and meaning They all require different way to become unusable.

To make text unusable to an end user, one can partially replace a text with same character or original text may be replaced by the other text of same type.

For blocking display of the sensitive label provided as an image, the rendering specification is executed to block the display of the image or to replace the image with the different image. For example, an end user requires to restrict the view of an image to un-authorized user, the end user may execute the rendering specification configured in accordance to the present subject matter for the same purpose. Further, to block the navigation from the sensitive label, the rendering specification is executed to block the navigation facilitated by the sensitive label. For example, the sensitive label facilitates a navigation link to authorized users from one document to the other document, then the rendering specification is configured to block the navigation in order to make the navigation unusable to an un-authorized end user.

Buttons are usually given role to perform some action on clicking them. For button, the functional action can be blocked through the rendering specification configured in accordance with the present subject matter.

Thus, different elements of the web document or web page require different ways to make them unusable to an end user due to their purpose and type of actions they can execute. For all these elements, varied rendering specifications have to be configured captured, so that if these rendering specification are applied to respective elements, these elements can be made unusable.

Validating Input Values:

For the purpose of increasing the security of an application, the rendering specification configured in accordance with the present subject matter can be executed. Due to security reasons, it is necessary to block certain types of inputs from an end user. An application that is accessible to entire internet community is also accessible to malicious internet users. Internet users belonging to malicious internet users category is to be prevented from damaging any application exposed to everyone over the internet.

Data input to any application is one of the easiest ways to break application in case the application is not properly designed. The malicious internet users may form different types of inputs to damage the application in order to achieve his certain goals, such as getting more information about the application, damaging the reputation of a company owning the application, etc.

In case of validating the input values corresponding to the sensitive label from an end user, specific type of data is blocked from an un-authorized end user to enhance security of an application. Further, if validation of data is not properly enabled in the application that accept input from an end user, then chances of application getting damaged from malicious or un-authorized internet users are very high. If application owner of the concerned application does not want to redesign the entire application in order to handle validation of inputs from the end user, then a rendering specification can be configured to block specific type of data. By configuring the rendering specification, specific type of data is blocked, which is cannot be treated as an input in any case.

User Activity Tracking:

Sometimes, there is need to track end user activities and an application does not have a built-in mechanism for tracking the end user activities. This problem becomes more complicated when activity tracking is to be performed for certain sections of web documents or web pages, for users having specific roles and for users who do not have the specific roles. To tackle this problem, additional component is to be developed which can be integrated into the application. But such component requires rendering specification, as which part of web document requires tracking depending on role of user who is using the application. So, the rendering specification for the said purpose can be generated according to the requirement and can be used by component to track the end user activities.

The rendering specification configured in accordance with the present subject matter can be used for tracking the end user activities. Thus, the rendering specification configured in accordance with the present subject matter enables an administrator to track the end user activities.

Automatic Login:

The rendering specification configured in accordance with the present subject matter can be used to facilitate automatic log-in, with out entering the credentials. According to the present subject matter, for automatic log-in, a log-in tool is developed to support the automatic log-in of an end user. The end user can access an account by just clicking on the log-in tool. For this purpose, the log-in tool is installed inside a web browser and helps the end user to configure the rendering specification for the purpose of automatic log-in. In first step for configuring the rendering specifications, identification of the sensitive labels in the web applications is to be performed. Thus, the creation of rendering specifications for any web page involves identifying the locations of the sensitive labels and values or data associated with the sensitive labels. For automatic log-in, the log-in tool identifies login interface including texts "Login ID" and "password" represented on a web document or a web page as the sensitive labels. Further, the blank spaces in front of the sensitive labels "Login ID" and "password" are considered as the values or data associated with the sensitive labels. Then, by the help of the log-in tool, the end user can configure the rendering specification for the data associated with the identified sensitive labels, "Login ID" and the "password". Thereafter, the rendering specification is saved and executed upon request. As mentioned earlier, by clicking the log-in tool, the rendering specification is executed and subsequently the credentials as the data associated with the sensitive labels, "Login ID" and "password", are automatically filled to perform the automatic log-in of the end user.

In an alternative implementation, the end user can be authenticated by using, for example, a single sign-on (SSO) or a windows domain system, before automatic log-in. In the said implementation, as the end user is authenticated by the single sign-on (SSO) or the windows domain system, one or more user can log-in in a single account without knowing the credentials of the said account. In other words, for a single account, an access can be provided to more than one user by using the present subject matter. In this way, no one other than the administrator would be able to know the correct credential.

Further, in view of the above cases, the sensitive labels may represent at least one of text, image, a functional button, a text-area, a selection box and a navigation link.

Thus, the aforesaid rendering specification creation approach, described in accordance with present subject matter, creates the rendering specification for the contents (web pages) by searching for sensitive labels and configuring different rendering specifications for different type of sensitive labels.

Figure 5:
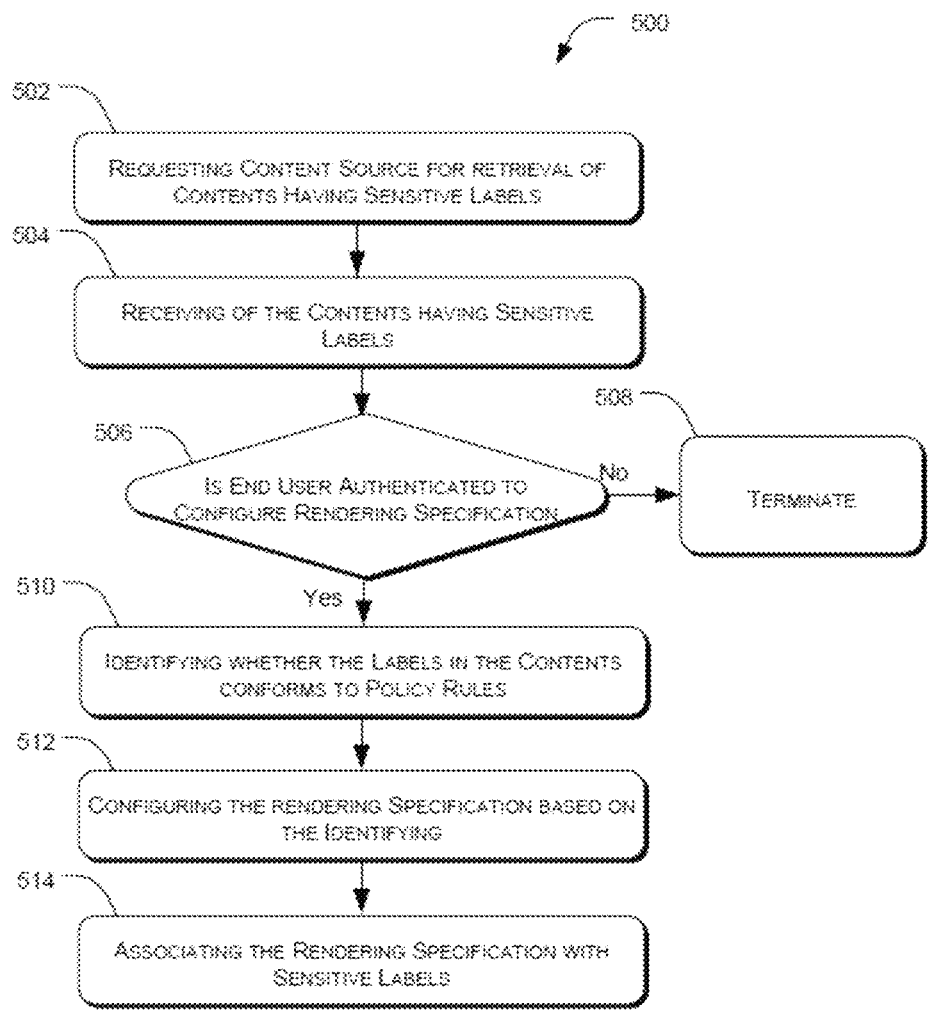
FIG. 5 illustrates a method to create rendering specification, in accordance with an embodiment of the present subject matter.
Figure 6:
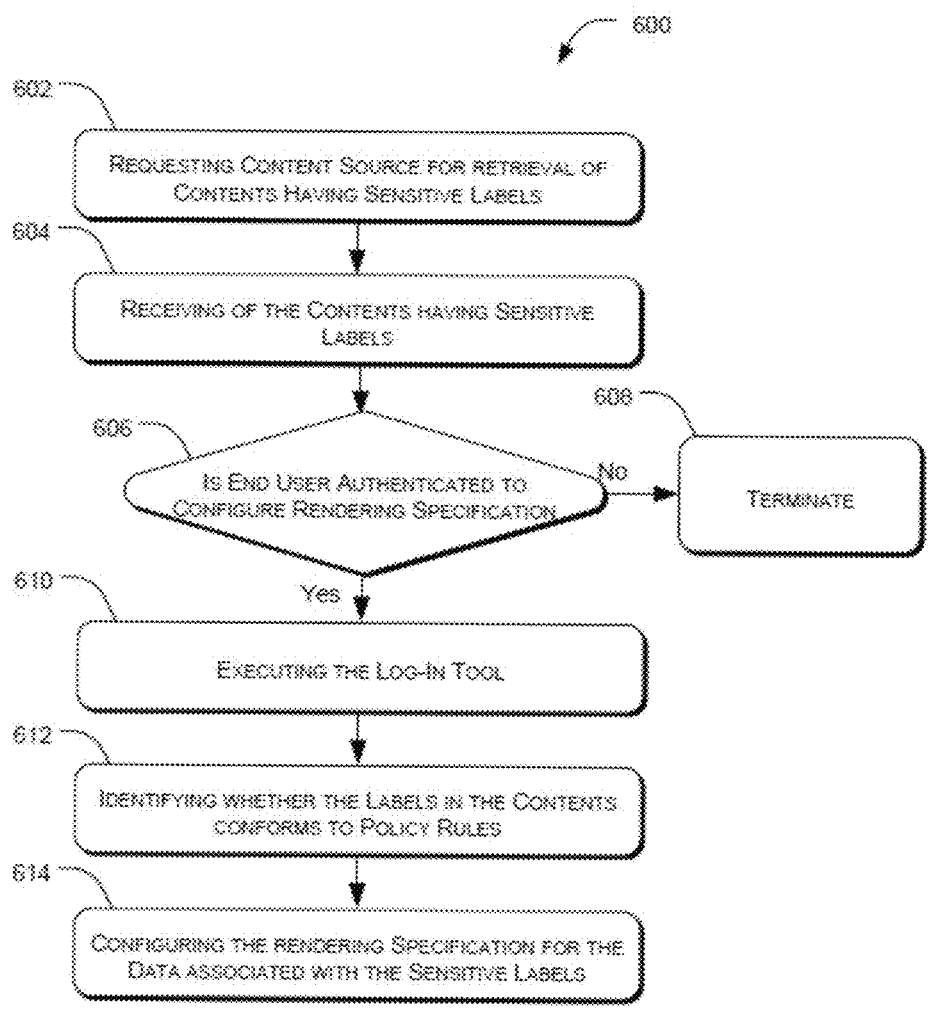
FIG. 6 illustrates a method to create rendering specification for the purpose of automatic log-in, in accordance with an embodiment of the present subject matter.

FIG. 5 illustrates a method 500 to create rendering specification through web document analysis, in accordance with an embodiment of the present subject matter. The method 500 may be described in the general context of computer executable instructions. The method 500 may be a computer implementable method. Generally, computer executable instructions can include routines, programs, objects, components, data structures, procedures, modules, functions, and the like that perform particular functions or implement particular abstract data types. The method may also be practiced in a distributed computing environment where functions are performed by remote processing devices that are linked through a communication network. In a distributed computing environment, computer executable instructions may be located in both local and remote computer storage media, including memory storage devices.

The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

In accordance with an embodiment of the present subject matter, the method 500 may be implemented in the previously described rendering specification creation system 104. However, it will be appreciated by one skilled in the art that such an implementation is not limiting. The method 500 may be implemented in a variety of such similar systems.

At step 502, a request is send by an end user from an application to a content source 102 for retrieval of one or more contents stored in the content source 102. Such content can include label that is considered as sensitive label. In an implementation, the content can be at least one of a web page, a web document, and a hypertext markup language (HTML) document.

In an implementation, the content source 102 can be a web server, the content can be a web page, and the application can be at least one of a web browser add-on application and a stand-alone application.

At step 504, the one or more contents are received by the end user in response to the request. Such content can include labels that are indicative of data considered as sensitive. Thereafter, at step 506, an end user authentication is carried out using, for example, single sign on (SSO) or windows domain system. Based on the end user authentication, it is determined whether the end user is authenticated to create or modify the rendering specification for the retrieved one or more contents. In case the end user is not authenticated to create or modify the rendering specification for the retrieved one or more contents, the method for creating the rendering specification is then terminated at step 508. However, in case the end user is authenticated to create or modify the rendering specification for the retrieved one or more contents, the policy rules specified via the policy setting module 410 of the rendering specification creation system 104 are employed.

In step 510, the sensitive analyzer module 412 implements the policy rules stored in the policy store 420, in order to identify the data of labels conforming to one of the plurality of policy rules stored in the policy store 420. The labels having data conforming to the policy rules are identified as the sensitive label.

Once the labels conforms to the policy rules, different rendering specifications are configured in accordance with the present subject matter for data associated with the identified sensitive labels by the rendering specification module 108, in step 512.

Thereafter, in step 514, the rendering specifications are associated with the sensitive labels and are stored in the rendering specification data 422.

The so configured rendering specifications can be executed to mask values or data associated with the sensitive labels, to block navigation from a link associated sensitive labels, to block display of the data associated with sensitive labels, to validate the input values or data associated with the sensitive labels, and to track end user activities performed on data associated with the sensitive labels.

In accordance with another embodiment of the present subject matter, a method 600 may be implemented in the previously described rendering specification creation system 104 to perform automatic log-in of an end user.

In this embodiment, at step 602, a request is send by an end user from an application to a content source 102 for retrieval of one or more contents stored in the content source 102. Such content can include label that has data considered as sensitive. In an implementation, the content can be at least one of a web page, a web document, and a hypertext markup language (HTML) document.

In an implementation, the content source 102 can be a web server, the content can be a web page, and the application can be at least one of a web browser add-on application and a stand-alone application.

At step 604, the one or more contents are received by the end user in response to the request. Thereafter, at step 606, an end user authentication is carried out using, for example, single sign on (SSO) or windows domain system. Based on the end user authentication, it is determined whether the end user is authenticated to create or modify the rendering specification for the retrieved one or more contents. In case the end user is not authenticated to create or modify the rendering specification for the retrieved one or more contents, the method for creating the rendering specification is then terminated at step 608.

However, in case the end user is authenticated to create or modify the rendering specification for the retrieved one or more contents, a log-in tool is executed for the purpose of configuring the rendering specification, in step 610. The log-in tool then invokes the sensitive analyzer module 412 to identify the labels conforming to one of the plurality of policy rules stored in the policy store 420, in step 612. In case of automatic log-in, the labels are usually identified as "Login ID" and "password".

Once the labels conforms to the policy rules, different rendering specifications are configured in accordance with the present subject matter for data associated with the sensitive labels by the rendering specification configuration module 108, in step 614. By the help of the log-in tool, the end user can configure the rendering specification for the data to be entered in the blank spaces provided in front of the labels, "Login ID" and the "password", of login interface.

The so configured rendering specification for automatic login can be executed in real time by clicking the log-in tool. On execution, the blank spaces provided in front of the labels, "Login ID" and the "password" are automatically filled with the credentials as per the configured rendering specification, which in turn allows the end user to log-in to the account.

Any of the methods described herein can be implemented by computer-executable instructions in one or more computer-readable media (for example, computer storage media or other tangible media). Further, the methods described herein can be implemented in a plurality of programming languages.

Although implementations for rendering of data associated with the sensitive label have been described in language specific to structural features and/or methods, it is to be understood that the present subject matter (and not appended claims) is not necessarily limited to the specific features or methods described. Rather, the specific features and methods for rendering of data associated with the sensitive label are disclosed as embodiments of the present subject matter.

We claim:

1. A method for rendering specification creation for web documents, comprising:
    sending a request from an application to a content source for retrieving one or more contents;
    receiving the one or more contents in response to the request in original form and identifying, within the one or more contents, labels as sensitive labels by a sensitive analyzer module when data associated with the labels are determined sensitive based on one or more user-defined policy rules and their structural locations, wherein the sensitive labels comprises personal identification information (PII) and wherein the one or more user defined policy rules comprises at least one of string token-based policy rules, hyperlink-based policy rules, pattern value-based policy rules, pattern key-based policy rules, and input control based rules;
    recognizing each of the one or more contents based on individual structures in a structured graph representation of the web document associated to the each of the one or more contents rather than a location address of the one or more contents;
    configuring rendering specifications for the data associated with the identified sensitive labels by executing the rendering specifications to perform masking transformation technique to mask the data associated with the identified sensitive labels at run-time using a specific masking tool, wherein the masking transformation technique masks by position of masking, number of positions to be masked and masking symbol to be used and wherein varied rendering specifications are configured depending on type of data associated with the sensitive labels, wherein the rendering specifications are configured on-the-fly based on dynamic factors such as time of a day, authentication of an end user, and an input from the end user;
associating the configured rendering specifications with the sensitive labels of the data determined as sensitive, wherein the structure of the one or more content for which the rendering specification is configured is similar to the structure of one or more content to which the rendering specification is associated; and
scanning and identifying by an active guidance module, within one or more contents analyzed by the sensitive analyzer module, sensitive labels not configured with the rendering specifications to alert the end user, and results in finding links to other content within the scanned one or more contents,
wherein prior to configuring rendering specifications, the sensitive labels are analyzed in a web page to generate a report.

2. The method as claimed in claim 1, wherein the sensitive labels represent at least one of a text, an image, a functional button, a navigation link, a text-area, and a selection box.

3. The method as claimed in claim 1 further comprising configuring the labels as the sensitive labels, wherein the configuring the labels comprises creation, modification and deletion of the labels as the sensitive labels.

4. The method as claimed in claim 1, wherein the identifying the labels as the sensitive labels comprises highlighting the sensitive labels with a colour distinct from the background colour of a content.

5. The method as claimed in claim 1, wherein the configuring the rendering specification comprises selecting individual sensitive labels.

6. The method as claimed in claim 5, wherein the selecting comprises choosing a rendering specification from a drop-down comprising a plurality of pre-defined rendering specifications.

7. The method as claimed in claim 5, wherein the configuring the rendering specification comprises creation, modification, and deletion of rendering specifications.

8. The method as claimed in claim 1, wherein the configuring the rendering specification comprises configuring hidden field rendering specification comprising:
searching the hidden fields in the contents; and
configuring the rendering specifications for the hidden fields.

9. The method as claimed in claim 1, wherein the content source is a web server and the contents represent one or more web pages.

10. The method as claimed in claim 9 further comprising managing roles of end users for the application, wherein the managing the roles comprises creation, modification, and deletion of roles of the end users.

11. The method as claimed in claim 1 further comprises tracking end user activities performed on data associated with the sensitive labels.

12. The method as claimed in claim 1, wherein the configuring the rendering specification comprises executing at least one of masking the data associated with the sensitive labels, blocking navigation from link associated with the sensitive label, blocking display of the data associated with the sensitive label, validating the input data associated with the sensitive labels, and facilitating automatic log-in for an account by automatically providing the credentials associated with the sensitive labels.

13. The method as claimed in claim 1, wherein the application is at least one of a web browser add-on application and a stand-alone application.

14. The method as claimed in claim 1, wherein the end user can at least search for existing rendering specification and remove the existing rendering specification executed on a particular data associated with the sensitive label instead of the rendering specification configuration.

15. A rendering specification creation system for web documents, comprising:
a processor; and
a memory coupled to the processor, the memory comprising:
a policy setting module to configure labels as sensitive labels in one or more contents;
a sensitive analyzer module to identify the sensitive labels when data associated with the labels are determined sensitive based on one or more user-defined policy rules and their structural locations, wherein the sensitive labels comprises personal identification information (PII) and wherein the one or more user defined policy rules comprises at least one of string token-based policy rules, hyperlink-based policy rules, pattern value-based policy rules, pattern key-based policy rules, and input control based rules;
a page uniqueness module to recognize each of the one or more contents based on individual structures of the one or more contents in the structured graphical representation of the web document rather than a location address of the one or more contents;
a rendering specification configuration module to configure rendering specifications for data associated with the identified sensitive labels by executing the rendering specifications to perform masking transformation technique to mask the data associated with the identified sensitive labels at run-time using a specific masking tool, wherein the masking transformation technique masks by position of masking, number of positions to be masked and masking symbol to be used and wherein varied rendering specifications are configured depending on type of data associated with the sensitive labels, wherein the rendering specifications are configured on-the-fly based on dynamic factors such as time of a day, authentication of an end user, and an input from the end user;
a rendering specification associating module to associate the configured rendering specifications with the sensitive labels of the data determined as sensitive, wherein the structure of the one or more content for which the rendering specification is configured is similar to the structure of one or more content to which the rendering specification is associated; and
an active guidance module to scan and identify, within one or more contents analyzed by the sensitive analyzer module, sensitive labels not configured with rendering specifications to alert the end user, and results in finding links to other content within the scanned one or more contents,
wherein prior to configuring rendering specifications, the sensitive labels are analyzed in a web page to generate a report.

16. The rendering specification creation system as claimed in claim 15, wherein the one or more contents represent one or more web pages.

17. The rendering specification creation system as claimed in claim 15, wherein the sensitive label represents at least one of a text, an image, a functional button, a text-area, a selection box, and a navigation link.

18. The rendering specification creation system as claimed in claim 15, wherein the contents are formatted according to at least one of a hyper text markup language (HTML) and an extensible markup language (XML).

19. The rendering specification creation system as claimed in claim 15 further comprising a record-and-play module to enable the end user to go through the history of the process of configuring the rendering specification.

* * * * *